US006665806B1

(12) United States Patent
Shimizu

(10) Patent No.: US 6,665,806 B1
(45) Date of Patent: Dec. 16, 2003

(54) POWER SAVING FOR A PORTABLE INFORMATION PROCESSING APPARATUS USING SWITCH THAT SHUTS OFF POWER TO SUB MEMORY BLOCK WHEN IN BATTERY MODE AND SUPPLIES POWER WHEN IN AC MODE

(75) Inventor: Yutaka Shimizu, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/487,783

(22) Filed: Jan. 20, 2000

(30) Foreign Application Priority Data

Jan. 20, 1999 (JP) .......................................... 11-012478

(51) Int. Cl.[7] .................................................. G06F 1/32
(52) U.S. Cl. ......................... 713/324; 713/340; 365/227
(58) Field of Search ............................... 365/226, 227; 713/322, 324, 340

(56) References Cited

U.S. PATENT DOCUMENTS

| 5,414,670 | A | * | 5/1995 | Schaefer | ................ 365/230.03 |
| 5,615,162 | A | * | 3/1997 | Houston | ...................... 365/226 |
| 5,652,891 | A | * | 7/1997 | Kitamura et al. | ............ 713/324 |
| 5,752,045 | A | * | 5/1998 | Chen | ........................... 713/321 |
| 6,418,535 | B1 | * | 7/2002 | Kulakowski et al. | ........ 713/320 |
| 6,516,418 | B1 | * | 2/2003 | Lee | ............................. 713/320 |

FOREIGN PATENT DOCUMENTS

JP 02270011 A * 11/1990 ............. G06F/1/32

OTHER PUBLICATIONS

IBM Disclosure Bulletin, "Programmable Selective Power Control in a Distributed Power System", vol. 33, No. 11, pp. 378–379, Apr. 1991.*

* cited by examiner

Primary Examiner—Thomas Lee
Assistant Examiner—Albert Wang
(74) Attorney, Agent, or Firm—Oblon, Spivak, McClelland, Maier & Neustadt, P.C.

(57) ABSTRACT

A portable information processing apparatus includes a memory, an AC/DC converter, a built-in battery, a power source detection mechanism, and a switch. The memory includes a main memory block and a sub memory block. The AC/DC converter converts an AC voltage to a DC voltage supplied to the memory. The built-in battery supplies a battery DC voltage supplied to the memory. The power source detection mechanism detects whether the apparatus operates with the converted AC to DC voltage or the battery DC voltage. The power source detection mechanism generates a detection signal when detecting the battery DC voltage. If the switch receives no detection signal from the power source detection mechanism, the switch supplies the converted AC to DC voltage and the battery DC voltage to the main and sub memory blocks. Otherwise, he switch shuts off a supply of the battery DC voltage to the sub memory block of the memory when receiving the detection signal from the power source detection mechanism.

24 Claims, 2 Drawing Sheets

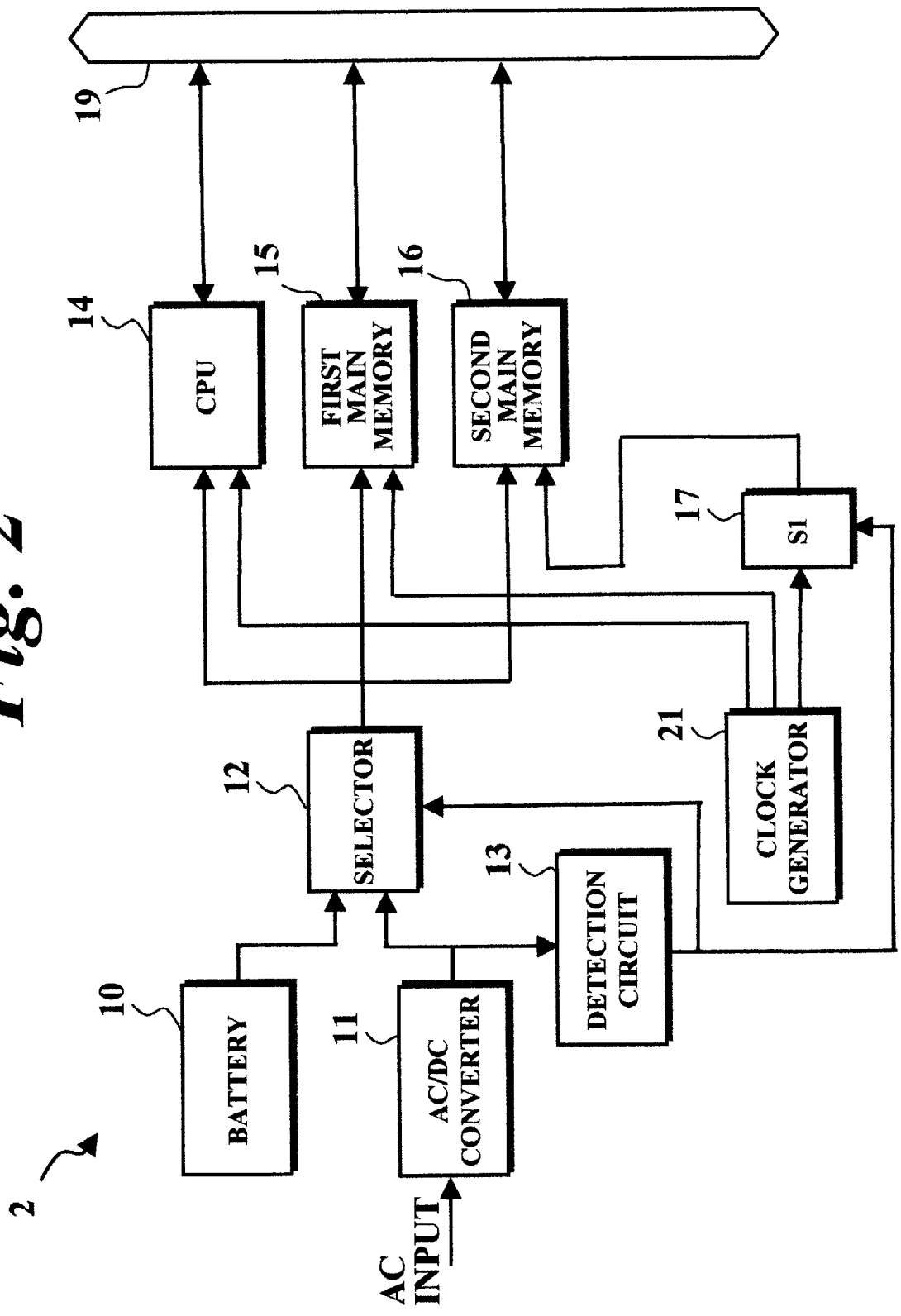

POWER SAVING FOR A PORTABLE INFORMATION PROCESSING APPARATUS USING SWITCH THAT SHUTS OFF POWER TO SUB MEMORY BLOCK WHEN IN BATTERY MODE AND SUPPLIES POWER WHEN IN AC MODE

CROSS REFERENCE TO RELATED APPLICATIONS

This application claims priority under 35 U.S.C. §119 to Japanese patent application No. 11-012478 filed Jan. 20, 1999, the entire contents of which are hereby incorporated by reference;

BACKGROUND OF THE INVENTION

1. Field of the Invention

The present invention generally relates to a method and apparatus of power saving, and more particularly to a method and apparatus of selectively power saving on a portable information processing apparatus using a built-in battery and an external power source.

2. Discussion of the Background

Recently, an extended data out dynamic random access memory (EDO DRAM) is being replaced to a great extent by a synchronous DRAM to be used as a main memory in a portable information processing apparatus such as for example a note-type PC (personal computer), a PDA (personal digital assistants), or the like. The synchronous DRAM consumes more power than the EDO DRAM but can operate in synchronism with an external clock signal at a frequency of 100 MHz or faster.

Generally, the above-mentioned portable information processing apparatus can selectively use an AC (alternate current) power and a built-in-battery power. In such portable information processing apparatus, the main memory, which is increasingly required to be greater in size, is not always in full-use. For example, in an office environment where AC power is available, the portable information processing apparatus may be put in a place where the main memory can be fully used. However, if the portable information processing apparatus is used outside where the built-in battery can be the only power, an application may not require a mass amount of data. In those instances, it would be desirable for the portable information processing apparatus to not fully use the main memory.

However, in the portable information processing apparatus, the power is generally supplied to all main memory despite the fact that all the main memory is not necessarily used. Accordingly, power is wasted, and battery lifetime expires sooner than necessary. This becomes a problem, in particular, when the synchronous DRAM is used as the main memory since this memory consumes more power than the EDO DRAM.

SUMMARY OF THE INVENTION

The present invention provides a novel portable information processing apparatus which includes a memory, an AC/DC converter, a built-in battery, a power source detection mechanism, and a switch. The memory includes a main memory block and a sub memory block. The AC/DC converter converts an AC voltage to a DC voltage which is supplied to the memory. The built-in battery supplies a battery DC voltage which is supplied to the memory. The power source detection mechanism performs a power source detection operation in which a condition as to whether the apparatus operates with converted AC or battery DC voltage. The power source detection mechanism is configured to generate a detection signal when detecting the battery DC voltage. If the switch receives no detection signal from the power source detection mechanism, the switch supplies the converted AC to DC voltage and the battery DC voltage to the main and sub memory blocks. Otherwise, the switch is configured to shut off a supply of the battery DC voltage to the sub memory block of the memory when receiving the detection signal from the power source detection mechanism.

The power source detection mechanism may perform the power source detection operation during a start time of the apparatus. In this case, the switch immediately may act in response to a result of the power source detection operation and maintain its switching condition after the start time.

Further, the present invention provides a novel portable information processing apparatus which includes a memory, a clock generator, an AC/DC converter, a built-in battery, a power source detection mechanism, and a switch. The memory includes a main memory block and a sub memory block. Each of the main and sub memory blocks is configured with a plurality of synchronous DRAMs. The clock generator generates clock signals and is configured to send the clock signals to each of the plurality of synchronous DRAMs of the main and sub memories of the memory. The AC/DC converter converts an AC voltage to a DC voltage which is supplied to the memory. The built-in battery supplies a battery DC voltage which is supplied to the memory. The power source detection mechanism performs a power source detection operation in which a condition as to whether the apparatus operates with the DC voltage or the battery DC voltage is detected. The power source detection mechanism is configured to generate a detection signal when detecting the battery DC voltage. The switch receives the clock signals from the clock generator and supplies the clock signals to the sub memory. The switch is configured to shut off a supply of the clock signals to the sub memory when receiving the detection signal from the power source detection mechanism so that the battery DC voltage is cut off in a circuit of the synchronous DRAMs.

The power source detection mechanism may perform the power source detection operation during a start time of the apparatus. In this case, the switch immediately may act in response to a result of the power source detection operation and maintain its switching condition after the start time.

Further, the present invention provides a novel method of power saving in an information processing apparatus with a main memory block and a sub memory block, an AC/DC converter for converting AC to DC voltage, and a built-in battery. The method steps include performing a power source detection and shutting off a supply of the battery voltage to the sub memory block when it is determined that the apparatus operates with the the battery DC voltage.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG 2. is a schematic block diagram of an exemplary portable information processing apparatus according to a second embodiment of the present invention.

DESCRIPTION OF THE PREFERRED EMBODIMENTS

Figure 1:
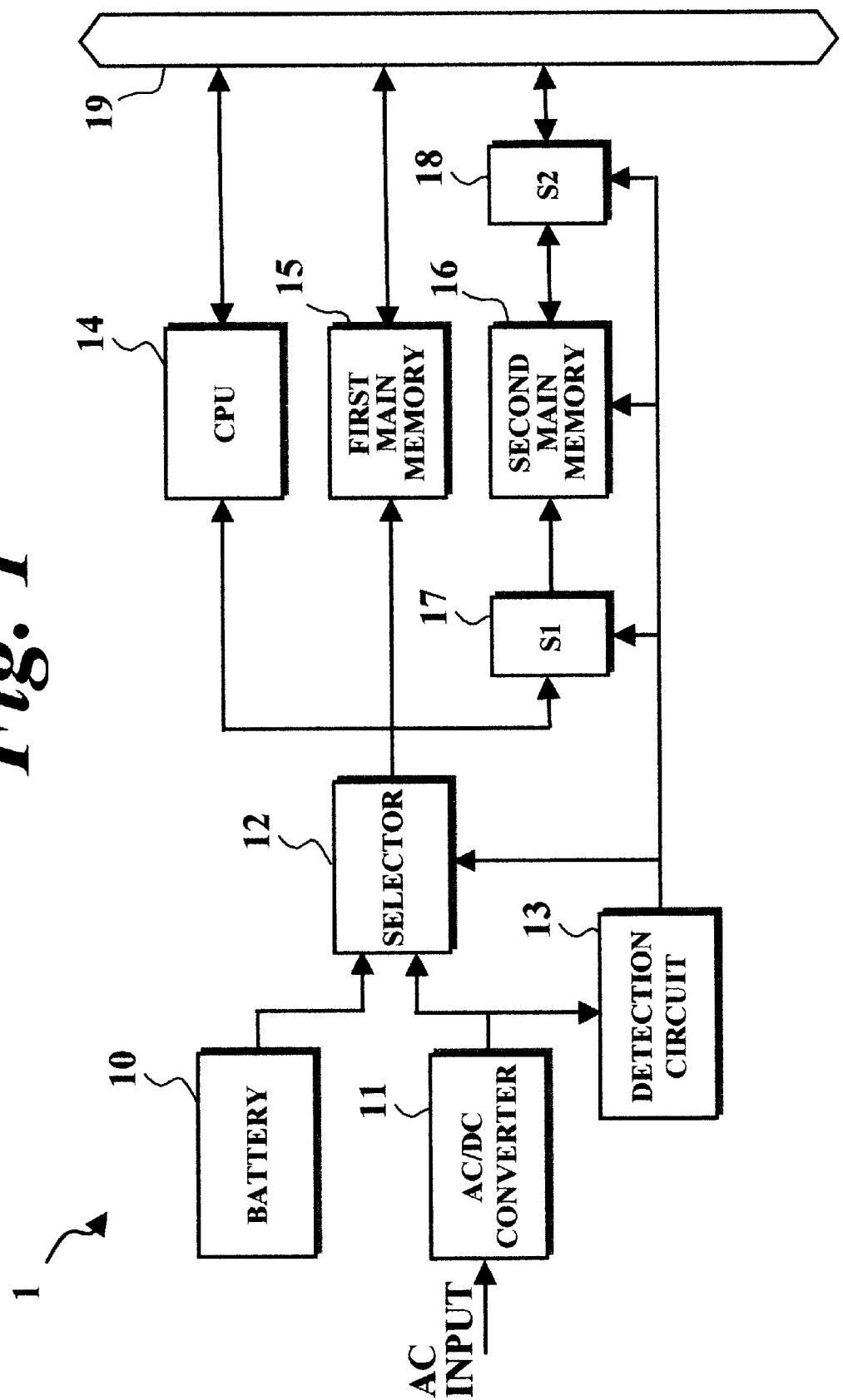
FIG 1. is a schematic block diagram of an exemplary portable information processing apparatus according to a first embodiment of the present invention.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated a block diagram of a portable information processing apparatus 1 according to a first embodiment of the present invention. The portable information processing apparatus 1 of FIG. 1 includes a battery 10, an AC/DC converter 11, a selector 12, a detection circuit 13, a CPU (central processing unit) 14, a first main memory 15, a second main memory 16, a switch (S1) 17, a switch (S2) 18, and a system bus 19.

The CPU 14, the first main memory 15, and the switch 18 are directly connected to the system bus 19. The CPU 14 controls the entire operations of the above components operatively connected thereto via the system bus 19. The battery 10 is a built-in power source such as a rechargeable battery, a dry battery, or the like. An output of the battery 10 is input to the selector 12.

The AC/DC converter 11 is connected to an AC terminal (not shown) and converts an AC voltage to a DC voltage. An output of the AC/DC converter 11 is input to the selector 12 and the detection circuit 13.

The detection circuit 13 detects the output from the AC/DC converter 11 to check whether the output is greater than a predetermined value. That is, it checks whether the portable information processing apparatus 1 is supplied with AC power. If the portable information processing apparatus 1 is supplied with AC power, the detection circuit 13 sends a corresponding signal to the selector 12 and to the switches 17 and 18.

Upon receiving the above-mentioned detection signal from the detection circuit 13, the selector 12 supplies the output power (the DC voltage) from the AC/DC converter 11 to the CPU 14, the first main memory 15, and the switch 17. If the selector 12 receives no detection signal from the detection circuit 13, that is, no output power from the AC/DC converter 11, the selector 12 supplies the output power from the battery 10 to the CPU 14, the first main memory 15, and the switch 17.

The first main memory 15 has a predetermined amount of memory capacity sufficient to be used when the portable information processing apparatus 1 is used as a portable machine, that is, when it works with the power from the battery 10. The second main memory 16 has an arbitrary amount of memory capacity. When the portable information processing apparatus 1 is used as a portable PC, the first main memory 15 can be used as a standard memory, and the second main memory 16 can be used as an add-on optional memory.

These first and second main memories 15 and 16 are mounted on the same substrate but are provided with separate power supply lines from the selector 12. In particular, the first main memory 15 is configured to be always supplied with the power during the time when the portable information processing apparatus 1 is in operation. The second main memory 16 is supplied with the power via the switch 17.

The switch 17 is configured to turn on when receiving the detection signal from the detection circuit 13 and supplies the power from the selector 12 to the second main memory 16. That is, when the portable information processing apparatus 1 is supplied with the AC power, both of the first and second main memories 15 and 16 are supplied with the power. When the portable information processing apparatus 1 is not supplied with the AC power, the switch 17 is turned off and the second main memory 16 is not supplied with the power. At the same time when the switch 17 is turned off by the detection signal from the detection circuit 13, the switch 18 is also turned off by the same detection signal. Therefore, the second main memory 16 is operatively separated from the system bus 19 at this time.

In this way, in the portable information processing apparatus 1, both the first and second main memories 15 and 16 will be supplied with power when the AC power is supplied, while power is saved and is supplied only to the first main memory 15 when the portable information processing apparatus 1 works with power from the battery 10. As a result of such a power saving, the portable information processing apparatus 1 can be driven longer with the same battery 10.

A preferred handling of the detection signal of the detection circuit 13 is as follows. The detection circuit 13 operates only before the portable information processing apparatus 1 starts its operation system. Then, the switch 17 is turned on or off in accordance with a result of the power source detection operation performed by the detection circuit 13. After that, this condition of the switch 17 is maintained so that an effective amount of main memory, which is determined before the portable information processing apparatus 1 has started its operation system, is not changed even if the power source is changed. In this way, the portable information processing apparatus 1 can properly control the total memory, regardless of an intermediate change of the power source.

Referring to FIG. 2, a portable information processing apparatus 2 according to a second embodiment of the present invention will be explained. The portable information processing apparatus 2 of FIG. 2 includes various components similar to those included in the portable information processing apparatus 1 of FIG. 1, such as the battery 10, the AC/DC (alternate current to direct current) converter 11, the selector 12, the detection circuit 13, the CPU (central processing unit) 14, the first main memory 15, the second main memory 16, the switch (S1) 17, and the system bus 19. In addition, the portable information processing apparatus 2 further includes a clock generator 21. The CPU 14, the first main memory 15, and the second main memory 16 are directly connected to the system bus 19.

The CPU 14 controls the entire operations of the above components operatively connected thereto via the system bus 19. The battery 10 is a built-in power source such as a rechargeable battery, a dry battery, or the like. An output of the battery 10 is input to the selector 12.

The AC/DC converter 11 is connected to an AC (alternate current) terminal (not shown) and converts an AC (alternate current) voltage to a DC (direct current) voltage. An output of the AC/DC converter 11 is input to the selector 12 and the detection circuit 13.

The detection circuit 13 detects the output from the AC/DC converter 11 to check whether the output is greater than a predetermined value. That is, it checks whether the portable information processing apparatus 2 is supplied with AC power. If the portable information processing apparatus 2 is supplied with AC power, the detection circuit 13 sends a corresponding signal to the selector 12 and the switch 17.

Upon receiving the above-mentioned detection signal from the detection circuit 13, the selector 12 supplies output power (the converted AC voltage) from the AC/DC converter 11 to the CPU 14, the first main memory 15, and the second main memory 16. If the selector 12 receives no detection signal from the detection circuit 13, that is, no output power from the AC/DC converter 11, the selector 12 supplies the output power from the battery 10 to the CPU 14 and the first main memory 15.

The first and second main memories 15 and 16 include a plurality of synchronous DRAMs (dynamic random access memories). Each of the plurality of synchronous DRAMs is configured to be supplied clock signals. The first main memory 15 has a predetermined amount of memory capacity sufficient to be used when the portable information processing apparatus 2 is used as a portable machine, that is, when it works with power from the battery 10. The second main memory 16 has an arbitrary amount of memory capacity. When the portable information processing apparatus 2 is used as a portable PC, the first main memory 15 can be used as a standard memory, and the second main memory 16 can be used as an add-on optional memory.

The clock generator 21 generates clock signals and input the clock signals to the CPU 14 so that the clock signals are made in synchronism with the operations of the CPU 14. The clock generator 21 further inputs the clock signals to the first main memory 15. The clock generator 21 further input the clock signals to the second main memory 16 via the switch 17. The switch 17 is turned on only when receiving the detection signal from the detection circuit 13 and, upon turning on, sends the clock signals from the clock generator 21 to the second main memory 16. That is, when the portable information processing apparatus 2 is supplied with the AC power, the switch 17 is turned on. Accordingly, the first and second main memories 15 and 16 are supplied with the clock signals. On the contrary, when the portable information processing apparatus 2 is not supplied with the AC power, the switch 17 is turned off. In this case, the second main memory 16 is not supplied with the clock signals.

In this way, in the portable information processing apparatus 2, both the first and second main memories 15 and 16 will be supplied with power when AC power is supplied. However, power is saved and supplied only to the first main memory 15 when the portable information processing apparatus 1 works with the power from the battery 10. As a result of such a power saving, the portable information processing apparatus 2 can be driven longer with the same battery 10.

A preferred handling of the detection signal of the detection circuit 13 is as follows. The detection circuit 13 operates only before the portable information processing apparatus 2 starts its operation system. Then, the switch 17 is turned on or off in accordance with a result of the power source detection operation performed by the detection circuit 13. After that, this condition of the switch 17 is maintained so that an effective amount of main memory, which is determined before the portable information processing apparatus 2 has started its operation system, is not changed even if the power source is changed. In this way, the portable information processing apparatus 2 can properly control the total memory, regardless of an intermediate change of the power source.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. An information processing apparatus, comprising:
  a memory including a main memory block and a sub memory block;
  an AC/DC converter configured to convert an AC voltage to a DC voltage which is supplied to said memory;
  a built-in battery configured to supply a battery DC voltage which is supplied to said memory;
  a power source detection mechanism configured to detect whether said apparatus operates with said converted AC to DC voltage or said battery DC voltage and to generate a detection signal when detecting said battery DC voltage; and
  a selector configured to receive said detection signal from said power source detection mechanism, and to supply said converted AC to DC voltage or said battery DC voltage to said main memory block; and
  a switch configured to receive an output from said selector and to receive said detection signal, and further configured to supply said converted AC to DC voltage to said sub memory block and to shut off a supply of said battery DC voltage to said sub memory block upon receiving said detection signal.

2. The information processing apparatus as defined in claim 1, wherein said power source detection mechanism detects said power source during a start time of said apparatus and said switch immediately acts in response to a result of said power source detection and maintains its switching condition after said start time.

3. The information processing apparatus as defined in claim 2, wherein the information processing apparatus comprises a personal computer.

4. The information processing apparatus as defined in claim 2, wherein the information processing apparatus comprises a personal digital assistant.

5. An information processing apparatus, comprising:
  a memory including a main memory block and a sub memory block, each of said main and sub memory blocks configured with a plurality of synchronous DRAMs;
  a clock generator configured to generate clock signals and to send said clock signals to each of said plurality of synchronous DRAMs;
  an AC/DC converter configured to convert an AC voltage to a DC voltage which is supplied to said memory;
  a power source detection mechanism configured to detect whether said apparatus operates with said converted AC to DC voltage or said battery DC voltage and to generate a detection signal when detecting said battery DC voltage;
  a selector configured to receive said detection signal from said power source detection mechanism, and to supply said converted AC to DC voltage or said battery DC voltage to said main memory block; and a switch configured to receive said clock signals from said clock generator, to supply said clock signals to said sub memory, and to shut off a supply of said clock signals to said sub memory block upon receiving said detection signal so that said battery DC voltage is cut off in a circuit of said synchronous DRAMs of said sub memory block.

6. The information processing apparatus as defined in claim 5, wherein said power source detection mechanism detects said power source during a start time of said apparatus and said switch immediately acts in response to a result of said power source detection and maintains its switching condition after said start time.

7. The information processing apparatus as defined in claim 6, wherein the information processing apparatus comprises a personal computer.

8. The information processing apparatus as defined in claim 6, wherein the information processing apparatus comprises a personal digital assistant.

9. An information processing apparatus, comprising:
   a memory device including a main memory block and sub memory block;
   means for converting an AC voltage to a DC voltage which is supplied to said memory device;
   means for supplying a battery DC voltage which is supplied to said memory device;
   means for detecting whether said apparatus operates with said converted AC to DC voltage or said battery DC voltage and for generating a detection signal when detecting said battery DC voltage;
   selector means for receiving said detection signal from said detecting means, and for supplying said converted AC voltage or said battery DC voltage to said main memory block: and
   switch means for receiving an output from said selector and to receive said detection signal, for supplying said converted AC to DC voltage to said sub memory block and for shutting off a supply of said battery DC voltage to said sub memory block when receiving said detection signal.

10. The information processing apparatus as defined in claim 9, wherein said detecting means detects said power source during a start time of said apparatus and said switch means immediately acts in response to a result of said power source detection and maintains its switching condition after said start time.

11. The information processing apparatus as defined in claim 10, wherein the information processing apparatus comprises a personal computer.

12. The information processing apparatus as defined in claim 10, wherein the information processing apparatus comprises a personal digital assistant.

13. An information processing apparatus, comprising:
   a memory including a main memory block and a sub memory block, each of said main and sub memory blocks configured with a plurality of synchronous DRAMs;
   means for generating clock signals and sending said clock signals toe ach of said plurality of synchronous DRAMS of said main and sub memory blocks of said memory device;
   means for converting an AC voltage to a DC voltage which is supplied to said memory device;
   means for supplying a battery DC voltage which is supplied to said memory device;
   means for detecting whether said apparatus operates with said converted AC to DC voltage or said battery DC voltage and for generating a detection signal when detecting said battery DC voltage; and
   selector means for receiving said detection signal from said power source detection mechanism, and for continuously supplying said converted AC to DC voltage or said battery DC voltage to said main memory block; and
   switching means for receiving said clock signals from said clock generating means, for supplying said clock signals to said sub memory block, for shutting off a supply of said clock signals to said sub memory block when receiving said detection signal so that said battery DC voltage is cut off in a circuit of said synchronous DRAMs of said sub memory block.

14. The information processing apparatus as defined in claim 13, wherein said detecting means detects said power source during a start time of said apparatus and said switch means immediately acts in response to a result of said power source detection and maintains its switching condition after said start time.

15. The information processing apparatus as defined in claim 14, wherein the information processing apparatus comprises a personal computer.

16. The information processing apparatus as defined in claim 14, wherein the information processing apparatus comprises a personal digital assistant.

17. A method of power saving in an information processing apparatus with a memory including a main memory block and a sub memory block, and AC/DC converter configured to convert an AC voltage to a DC voltage which is supplied to said memory, and a built-in battery configured to provide a battery DC voltage which is supplied to said memory, comprising the steps of:
   detecting whether said apparatus operates with said converted AC to DC voltage or said battery DC voltage;
   supplying said converted AC to DC voltage or said battery DC voltage to said main memory block:
   supplying, via a switch, said converted AC to DC voltage to said sub memory block; and
   shutting off via the switch a supply of said battery DC voltage to said sub memory block when a condition that said apparatus operates with said battery DC voltage is detected.

18. The method as defined in claim 17, wherein said detecting step occurs during a start time of said apparatus and said shutting-off step immediately acts in response to a result of said detecting step and maintains its condition after said start time.

19. The method as defined in claim 18, wherein the method of power saving applies to a personal computer.

20. The method as defined in claim 18, wherein the method of power saving applies to a personal digital assistant.

21. A method of power saving in an information processing apparatus with a memory including a main memory block and a sub memory block, each of said main and sub memory blocks being configured with a plurality of synchronous DRAMs, and AC/DC converter configured to convert an AC voltage to a DC voltage which is supplied to said memory, and a built-in battery configured to provide a battery DC voltage which is supplied to said memory, comprising the steps of:
   sending clock signals to each of said plurality of synchronous DRAMs of said main and sub memories of said memory;

detecting whether said apparatus operates with said converted AC to DC voltage or said battery DC voltage; and supplying said converted AC to DC voltage or said battery DC voltage to said main memory block;

supplying said converted AC to DC voltage to said sub memory block; and shutting off via a switch a supply of said clock signals to said sub memory block when a condition that said apparatus operates with said battery DC voltage is detected.

22. The method as defined in claim 21, wherein said detecting step occurs during a start time of said apparatus and said shutting off step immediately acts in response to a result of said detecting step and maintains the switch condition after said start time.

23. The method as defined in claim 22, wherein the method of power saving applies to a personal computer.

24. The method as defined in claim 22, wherein the method of power saving applies to a personal digital assistant.

* * * * *